Sept. 6, 1966  E. C. POLHAMUS ETAL  3,270,989
VARIABLE SWEEP AIRCRAFT
Filed March 30, 1965
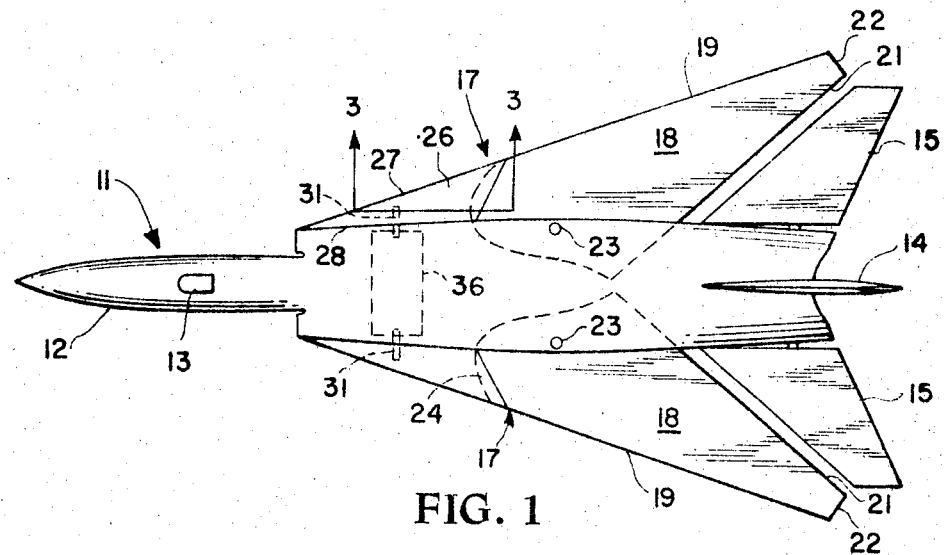
FIG. 1
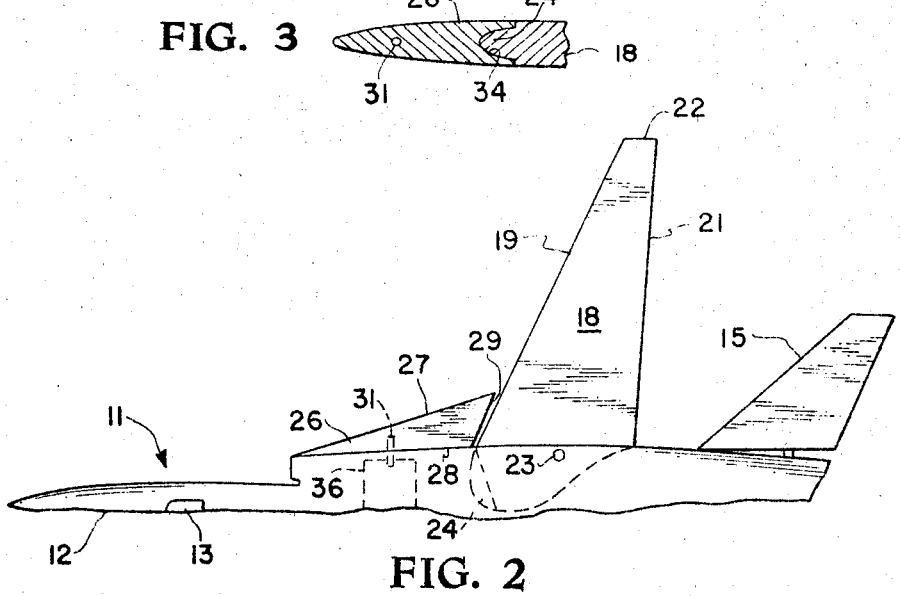
FIG. 3
FIG. 2
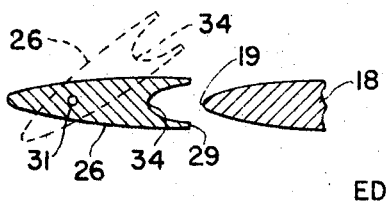
FIG. 4
INVENTORS
EDWARD C. POLHAMUS
ALEXANDER D. HAMMOND
BY
ATTORNEYS

United States Patent Office 3,270,989
Patented Sept. 6, 1966

3,270,989
VARIABLE SWEEP AIRCRAFT
Edward C. Polhamus, Newport News, and Alexander D. Hammond, Hampton, Va., assignors to the United States of America as represented by the Administrator of the National Aeronautics and Space Administration
Filed Mar. 30, 1965, Ser. No. 444,087
10 Claims. (Cl. 244—46)

The invention described herein may be manufactured and used by or for the Government of the United States of America for governmental purposes without the payment of any royalties thereon or therefor.

This invention relates generally to aerial vehicles, and relates in particular to supersonic aircraft having variable sweep wings.

The airframe configuration requirements for efficient supersonic flight are known to be incompatible with the configuration requirements for efficient subsonic flight as required for takeoff, climb, subsonic cruise and loiter, or descent and landing. For example, the optimum wing planform for low-speed flight, and conventional takeoff and landing, is considered to include a long span, narrow chord wing having a low sweep angle. The lift developed by a wing, other factors such as angle of attack, plan area, and dynamic pressure being equal, increases with increasing aspect ratio and decreases with increasing sweep angle. Aspect ratio, as is well known, may be defined as the square of the span of the wing divided by the plan area thereof. In addition, high lift flaps are most effective on low sweep wings. Thus, a long narrow wing may develop many multiples of the total lift obtainable with a short broad wing of the same plan area, thereby reducing the speed and/or angle of attack required for landing and takeoff. Drag due to lift is also reduced as the aspect ratio of an aircraft wing is increased to thereby provide high aerodynamic efficiency for subsonic cruise. The high aspect ratio wing, of course, permits relatively short takeoff and landing roll, as well as a steep climb to altitude, thereby making feasible the use of small and relatively rough airports which may be located in fairly densely populated areas, remote areas surrounded by trees, or the like. For transonic and supersonic flight, however, highly swept leading edge, low aspect ratio wings are preferable since the supersonic wave drag may be greatly reduced thereby improving the high speed performance and, since the gust response is reduced, thereby improving the low altitude, high speed ride qualities.

Considerable research has been conducted over a period of several years both in the United States and abroad toward development of an aircraft having optimum subsonic and supersonic flight characteristics. The most promising developments obtained from this research has been the in-flight variation of wing planform geometry and particularly involving the simultaneous in-flight varition of both wing sweep and aspect ratio made possible by the variable sweep concept. Intensive investigations of this concept have indicated the feasibility of in-flight wing rotation, and minimized some of the problems encountered in stability and control characteristics of the aircraft during in-flight wing sweep. U.S. Letters Patent No. 3,053,484 to W. J. Alford, Jr. and E. C. Polhamus describes a variable sweep wing employing provisions therein to compensate for the undesirable longitudinal stability problems encountered by variable sweep aircraft. Similarly, in U.S. Patent No. 3,104,082 to E. C. Polhamus, a double-pivot segmented variable sweep wing is disclosed which serves to eliminate the undesirable longitudinal pitch-up without the necessity of a low horizontal tail position and to compensate for at least a portion of the aerodynamic center shift during changes in wing sweep angle. This latter approach, while very attractive from an aerodynamic viewpoint, tends to encounter such problems as mechanical complexity, lack of sufficient wing stowage space and loss of usable fuselage volume due to the retraction of a portion of the variable sweep wing into the fuselage during its low-sweep position. The present invention, involving improvements in variable sweep wing aircraft, is considered to provide all the advantages of the wing configurations disclosed in the referenced patents while minimizing and eliminating some of the problem limitations experienced thereby.

Accordingly, it is an object of the present invention to provide a new and improved variable sweep wing configuration for a supersonic aircraft.

Another object of the present invention is the provision of a new and improved variable sweep wing aircraft with in-flight wing sweep being accomplished without adversely affecting the control and stability characteristics of the aircraft.

Another object of the present invention is a variable sweep aircraft of minimum mechanical complexity and providing improved usable fuselage volume.

Another object of the present invention is the provision of a segmented variable sweep aircraft wing having the rotative pivot points thereof located inboard adjacency on the aircraft fuselage.

Still another object of the present invention is the segmented variable sweep aircraft serving to alleviate pitch-up and aerodynamic center shift problems associated with changes in wing sweep angle.

Yet another object of the present invention is a novel wing segment for a variable sweep aircraft having free-floating aerodynamic characteristics during low-speed, low-sweep, high aspect ratio wing sweep conditions.

A further object of the present invention is an auxiliary wing panel serving to increase the effective wing areal plane at the forward edge of the variable sweep wing during high-sweep, low aspect ratio conditions.

According to the present invention, the foregoing and other objects are attained by providing, in a powered aircraft having a conventional fuselage, including a conventional aft empennage assembly and fuselage carried propulsion engines, a segmented variable sweep wing projecting from each side of the fuselage. Each wing includes a main wing panel pivotally connected to the fuselage near the outboard edge thereof for rotation in the wing areal plane to vary the leading edge sweep thereof, between a small angle on the order of about 25° and a large angle on the order of about 75°, and a forward auxiliary wing panel pivotally connected substantially intermediate the root length thereof to the fuselage for rotational movement only about said pivot point and in a pitch plane, or substantially perpendicular to the horizontal rotative plane of the main wing panel. The auxiliary wing panel of the present invention is linked to the main wing panel, effectively increasing the apex or root thereof for combined contributory aircraft lift, only when the main wing panel is in its high-sweep position.

The linkage between the forward auxiliary wing panel and the main wing panel is such that when the main wing panel is swept rearwardly toward its highest sweep attitude, an inwardly directed arcuate projection disposed at the forward end of the main wing panel is received by an arcuate bifurcated portion disposed at the aft end of the forward auxiliary wing panel being linearly alined with the leading edge of the main wing panel so that the entire wing during its highest sweep attitude is substantially free of discontinuities. When the main wing panel is swept forward to its low-sweep, high aspect ratio position, the forwardly disposed projection thereon is removed from the bifurcation aft of the auxiliary panel and the auxiliary wing panel is permitted to free-float about its laterally extending pivot connection.

Suitable control mechanism is provided in the aircraft fuselage for selectively engaging and disengaging the pivotal connection for the forwardly disposed auxiliary wing panel. Thus, when the control mechanism disengages the pivot connection, the auxiliary wing panel is permitted free rotation about its pivot point in response to changes in aerodynamic pressure and will provide substantially no pitching moment to the aircraft. When it is desired to sweep the main wing panel from its low-sweep, high aspect ratio attitude to its high-sweep, low aspect ratio attitude, the control mechanism will be actuated to engage the pivot connection and aline the bifurcated aft portion of the auxiliary panel with the rotational plane of the main wing panel to permit mating engagement therein of the forwardly disposed projection on the main wing panel during wing sweep.

A more complete appreciation of the invention and many of the attendant advantages thereof will be readily apparent as the same becomes better understood by reference to the following detailed description when considered in connection with the accompanying drawing wherein:

FIG. 1 is a plan view of the variable sweep wing aircraft of the present invention with the wings thereof disposed in a high-sweep, low aspect ratio, supersonic cruise attitude;

FIG. 2 is a plan view of the aircraft of FIG. 1, with parts broken away for clarity, wherein the aircraft wing is disposed in a low-sweep, high aspect ratio, subsonic takeoff, ascent, subsonic cruise or loiter, descent, and landing attitude;

FIG. 3 is a section taken along lines 3—3 of FIG. 1; illustrating the pivotal connection for the auxiliary wing panel or apex and the mating connection between the auxiliary and main wing panels when the main wing panel is in its high-sweep position; and, FIG. 4 is a section similar to FIG. 3, illustrating the auxiliary wing panel when disconnected from the main wing panel as in low-sweep attitude, with the phantom lines therein illustrating the free-floating capability of the auxiliary wing panel when the wing is in this position.

Referring now more particularly to the drawings, wherein like reference numerals designate identical parts throughout the several views, and more particularly to FIG. 1, there is shown a variable sweep wing planform aircraft, generally designated by the reference numeral 11. Aircraft 11 is provided with a conventional fuselage 12 having a reaction propulsion motor system mounted therein, and which is proportional to have a length to equivalent diameter, or fineness ratio, suitable for supersonic flight. A suitable control compartment, or pilot's cabin 13, is also included in fuselage 12 adjacent the forward end thereof, in a conventional manner. A conventional empennage assembly including a vertical stabilizer member 14 projecting upwardly from the upper surface of fuselage 12 and swept horizontal stabilizer members 15 are provided projecting outwardly from the aft end of fuselage 12. The airfoil sections of these stabilizer members 14 and 15 are preferably taken from the supersonic family of symmetrical thin airfoils. Stabilizer surfaces 15 are of the "all movable" type, as is well known in the art.

Aircraft 11 is provided with a wing projecting outwardly from each side of fuselage 12 and generally designated by the reference numeral 17. Each wing 17 includes a main wing panel 18 having a straight leading edge 19 and a straight trailing edge 21 which converge outwardly toward a tip section 22. Wing panel 18 includes a root section having an arcuate forward portion 24 which flares into a substantially straight after portion leading to an angular intersection with the straight trailing edge 21.

The root of main wing panel 18 extends into fuselage 12 through a suitable slot formed in the side thereof, not illustrated, and occupies a suitable recess within the fuselage 12. Main wing panel 18 is suitably connected to fuselage 12 for rotation in the wing areal, or planform, plane about a pivot point 23 located within fuselage 12 near the outboard edge thereof and which is located with respect to main wing panel 18 on about the fifty percent chord line thereof adjacent its root end.

Each wing 17 also includes a forward auxiliary wing panel, or apex 26 which is substantially triangular shaped in planform; having a straight leading edge 27, a straight root section 28, and a straight trailing edge 29. Auxiliary wing panel 26 is suitably connected to fuselage 12 for rotation in a pitch plane, or substantially perpendicular to the horizontal rotative plane of main wing panel 18 with rotative movement of auxiliary wing panel 26 being about pivot point 31.

Pivot point, or connection, 31 for wing panel 26 may be a suitable steel pin and bearing arrangement, or the like, and extends transversely from fuselage 12 for rigid connection with wing panel 26. Referring now more specifically to FIG. 3, the connection between panel or apex 26 and pivot 31 is located substantially intermediate the length of panel 26 along the straight root section 28 and slightly above the median center thereof, as will be further explained hereinafter.

By comparison of FIG. 1 and FIG. 2, it will be readily seen that when main wing panel 18 is positioned in the most forwardly swept attitude, the sweep angle of leading edge 19 thereof will be on the order of about 25°; trailing edge 21 will be disposed substantially perpendicular with respect to the plane of symmetry of aircraft 11; and tip section 22 will be substantially parallel to the aircraft plane of symmetry. In the high sweep attitude, the sweep angle of leading edge 19 on main wing panel 18 is on the order of about 75°, and merges linearly with leading edge 27 of auxiliary panel 26 so that the entire wing in this attitude is substantially free of discontinuities.

The entire wing 17 is so mounted on fuselage 12 with respect to the center of gravity of aircraft 11, that the quarter chord point of the mean aerodynamic chord of the main wing panel 18 when positioned in its forwardmost swept attitude and highest aspect ratio, will be positioned approximately at the same aircraft lonigtudinal station as the aircraft center of gravity.

Referring now more particularly to FIGS. 3 and 4, straight trailing edge 29 of auxiliary panel 26 is provided with an arcuate medial slotted portion for the receipt therein of arcuate forward projection 24 of main wing panel 18 in "tongue and groove" fashion when panel 18 is in the high sweep position. Thus, when main wing panel 18 is disposed in the high sweep attitude of FIG. 1, with respect to fuselage 12, it is readily seen that forward auxiliary wing panel 26 will be connected thereto so as to provide a forward extension or apex for main wing panel 18 that merges with fuselage 12. When main wing panel 18 is swept to the low-sweep attitude of FIG. 2, the arcuate forward projection 24 thereon is removed from the medial slotted area of auxiliary wing panel 26 and auxiliary panel 26 is then permitted to freely rotate about pivot point 31 in response to changing aerodynamic pressures during this low-sweep condition.

As schematically shown in phantom outline in FIGS. 1 and 2, a suitable control mechanism 36, such for example a gear and clutch mechanism, and having suitable friction reducing bearings therein, not shown, is connected to pivot pins 31 and controlled by the pilot of the aircraft, as conventionally with the other aircraft controls. Thus, during takeoff and climb to cruise altitude, panels 18 would be in the forward low-sweep attitude and control mechanism 36 would be so actuated as to permit free-floating pitch rotation of auxiliary wing panels 26 about their pivot points 31. During this portion of the flight, auxiliary panels 26 obviously will contribute substantially no pitching moment to aircraft 12 since any changes in aerodynamic pressure thereon merely causes rotation of the panels about their pivot points in a substantially free-floating condition, as shown in phantom lines in FIG. 4.

Upon the attainment of cruise altitude, main wing panels 18 are then rotated to the position shown in FIG. 1 for acceleration through the transonic speed range to the cruise Mach number. However, before main wing panels 18 are completely rotated from the position of low-sweep, FIG. 3, to the high-sweep attitude of FIG. 1, i.e. at some moderately swept position during the rotation toward high sweep, control mechanism 36 is actuated to engage the pivot connection 31 for panels 26, and panels 26 are alined with the rotative plane of main wing panel 18 so that forward projecting arcuate extensions or tongue 24 thereon will engage arcuate medial slotted portions 34 and thereby lock auxiliary panels 26 in alinement with main wing panels 18. Upon completion of the supersonic cruise portion of the journey and deceleration of aircraft 11 to subsonic speeds, wing panel 18 will then be swept forward to its high aspect ratio position wherein tongue 24 will be removed from groove 34 on auxiliary wing panel 26, with actuation of control mechanism 36 again disengaging pivot hinges 31 and permitting free rotation of auxiliary panels 26 about pivot connections 31, during aircraft descent, loiter, and landing. Additionally, in the event of any in-flight emergency requiring operation of aircraft 11 at subsonic speeds, wing 17 may be positioned in its high aspect ratio attitude, as illustrated in FIG. 2, to obtain maximum subsonic flight efficiency.

By the use of the present invention it is readily seen that the free-floating apex, or auxiliary panel 26, is allowed to free float when main wing panels 18 are in the low-sweep or subsonic position and adapted to be locked when panels 18 are swept back to the supersonic condition to effectively form the apex of a conventional swept back wing. This novel free-floating feature for the apex of a wing eliminates the subsonic pitch-up problems associated with a fixed, highly swept apex without resorting to wing "fixes" or special horizontal-tail locations. In addition, the normally expected increase in longitudinal stability with increasing sweep angles is reduced thereby allowing for a reduction in supersonic trim drag and an increase in aircraft maneuverability at supersonic speeds. Specifically, by allowing panel 26 to free-float when main wing panel 18 is at about the 25° sweep angle, there is a sizable shift of the wing aerodynamic center rearward towards that encountered at high sweep positions. This permits a more rearward location for the aircraft center of gravity such that the longitudinal stability with the wings in the high-sweep position can be readily reduced to thereby increase the high speed maneuverability and reduce the aircraft trim drag, normally associated with variable sweep aircraft, without encountering instability at low sweep angles. Both of these effects are obviously very important at supersonic speeds.

Also, by permitting the free-floating auxiliary wing panel 26 to remain on the exterior surface of aircraft 12, the wing sweep mechanism is substantially reduced in complexity over that, for example as required for the double-pivot wing disclosed in one of the patents referenced hereinbefore. Additionally, the free-floating panel of the present invention tends to eliminate the low speed pitch-up as normally encountered with variable sweep wings having a highly swept fixed apex. This is a very important contribution to the art in that it eliminates the need for specific wing "fixes" and does not restrict the location of the horizontal-tail to a position below the wing chord plane.

Test results have indicated that if the free-floating apex 26 is trimmed so that trailing edge 29 thereof floats below leading edge 19 of main panel 18, at low angles of attack, a sudden aircraft trim change is encountered at some moderate angle of attack due to a sudden change in the floating angle of apex 26. Thus, by trimming the apex or floating auxiliary panel 26 such that its trailing edge 29 tends to float above the main wing leading edge over the operational angle of attack range anticipated during subsonic cruise, the sudden trim change normally expected, is avoided. It is for this reason that the rigid connection of pivot 31 to panel 26 is positioned, FIG. 3, slightly above the median center thereof, although it is readily apparent that suitable trim tabs, or the like, could readily be provided on panel 26 to produce the same results.

The actual construction of the wing panel pivotal connection, as well as the control mechanism to effect typical movement of main wing panels 18 and the engagement and disengagement of pivot pin 31 for auxiliary panel 26 have been omitted in the interest of clarity, inasmuch as these details are considered conventional components and well known in the art. The showing of specific control surfaces and the like on the main wing panels 18 has likewise been omitted in the interest of clarity, however, such surfaces may be employed in the actual practice of the invention, as is well known in the art.

As is readily understood from the description hereinbefore, the present invention provides a relatively simple variable sweep aircraft in which adequate longitudinal and directional stability is obtained in both the high and low sweep positions. As apparent in the drawings, the main wing panel 18, in the low-sweep, high aspect ratio attitude, corresponds almost exactly to the shape of a fixed aircraft wing having low sweep and a high aspect ratio and designed solely for low speed operations, with free-floating auxiliary panels 26 positioned in front thereof providing substantially no pitching moment to the aircraft operation. When, however, main wing panel 18 is positioned in its high-sweep, low aspect ratio attitude as shown in FIG. 1, the entire wing 17 as defined by both main wing panel 18 and auxiliary panel 26 now locked thereto, corresponds almost exactly to the shape of a fixed wing having high sweep and a low aspect ratio as normally provided on an aircraft designed solely for normal supersonic operation. It is also readily apparent that the center of lift of the wing of the present invention remains positioned compatible with respect to the aircraft center of gravity at both extremes of sweep of main wing panel 18, due to the unique selective contributory lift and pitch-up moment characteristics of auxiliary panel 26.

Obviously, there are many modifications of the present invention possible in the light of the above teachings. For example, the slotted or bifurcated portion appearing on the trailing edge of auxiliary panel 26 could just as well be on the arcuate projection 34 of main wing panel 18 with the trailing edge 29 of the auxiliary panel 26 being adapted to be engaged therein, and as mentioned hereinabove, suitable trim tabs may be readily employed to influence the floating or angular rotation of apex 26 during its free-floating condition. These and other modifications of the present invention will be readily apparent to those skilled in the art. It is therefore to be understood that within the scope of the appended claims the invention may be practiced otherwise than as specifically described.

What is claimed as new and desired to be secured by Letters Patent of the United States is:

1. A variable sweep aircraft comprising:
   a fuselage having a fineness ratio suitable for supersonic flight,
   propulsion means carried by said fuselage,
   an empennage assembly carried by said fuselage adjacent the after end thereof,
   a wing connected to each side of said fuselage and projecting substantially horizontally and outwardly therefrom,
   each said wing including a main wing panel and a forward auxiliary wing panel, each said main wing panel having a straight leading edge pivotally connected to said fuselage for rotation in a substantially horizontal plane between a low-sweep position and a high-sweep position, each said auxiliary wing panel having a straight leading edge and pivotally connected at a single pivot point substantially intermediate the length thereof to said fuselage for rotational movement only about said single pivot and in a plane substantially perpendicular to the horizontal rotative plane of said main wing panel, and means engaging the trailing edge of said auxiliary wing panel and said leading edge of said main wing panel for combined contributory aircraft lift when said main wing panel is in said high-sweep position.

2. The variable sweep aircraft of claim 1 wherein said engaging means includes:

an arcuate medial slotted portion rearwardly disposed in said auxiliary wing panel; and a forwardly disposed arcuate projection on said main wing panel, said projection being received by said slotted portion when said main wing panel is in said high sweep position and being completely removed from said slotted portion of said auxiliary panel when said main wing panel is in said low sweep position.

3. The variable sweep aircraft of claim 2 including:

control means for selectively engaging and disengaging said auxiliary wing panel whereby said auxiliary wing panel may be engaged and positioned so as to aline the slotted portion therein in position to receive said projection of said main wing panel when wing sweep from a low sweep to a high sweep is desired and permitting disengagement of said auxiliary wing panel when said main wing panel is in said low sweep position to thereby release said auxiliary wing panel for free floating rotation about its pivot connection so as to nullify any pitching moment contribution thereof to said aircraft during said low-sweep position.

4. A variable sweep aircraft comprising:

a fuselage having a fineness ratio suitable for supersonic flight, propulsion means carried by said fuselage, an empennage assembly carried by said fuselage adjacent the after end thereof, a wing connected to each side of said fuselage and projecting substantially horizontally and outwardly therefrom, each said wing including a main wing panel and a forward auxiliary wing panel, each said main wing panel having a straight leading edge pivotally connected to said fuselage for rotation in a substantially horizontal plane between a low-sweep position and a high-sweep position, means engaging said forward auxiliary wing panel and said main wing panel when said main wing panel is in high sweep position and disengaging said panels when said main wing panel is in said low sweep position, said forward auxiliary wing panel providing a pitching moment to said aircraft only when said main wing panel is in said high-sweep position and being substantially free-floating when said main wing panel is in said low-sweep position.

5. The variable sweep aircraft of claim 4 wherein said:

means engaging said main wing panel and said auxiliary wing panel when said main wing panel is in said high-sweep position includes:

(a) a projection on said main wing panel, and
(b) a slotted portion in said auxiliary wing panel for receiving said projection, pivot means connecting said auxiliary wing panel to said fuselage and permitting rotational pitch of said auxiliary wing panel in a plane substantially perpendicular to the horizontal rotative plane of said main wing panel, control mean for (a) selectively engaging said auxiliary wing panel to aline said slotted portion therein in position to receive the projection of said main wing panel, and (b) disengaging said auxiliary wing panel when said main wing panel is in said low-sweep position to thereby permit free rotation of said auxiliary wing panel about said pivot means in response to changes in air pressure thereon to thereby prevent said auxiliary wing panel from contributing substantially to aircraft pitching moment when said main wing panel is in said low-sweep position.

6. A variable sweep aircraft comprising:

a fuselage having a fineness ratio suitable for supersonic flight, propulsion means carried by said fuselage, an empennage assembly carried by said fuselage adjacent the after end thereof, a wing connected to each side of said fuselage and projecting substantially horizontally and outwardly therefrom, each said wing including a main wing panel and a forward auxiliary wing panel, each said main wing panel having a straight leading edge pivotally connected to said fuselage for rotation in a subsbtantially horizontal plane between a low-sweep position and a high-sweep position, each said auxiliary wing panel having a straight leading edge and pivotally connected at a single pivot point substantially intermediate the length thereof to said fuselage for rotational movement only about said single pivot and in a plane substantially perpendicular to the horizontal rotative plane of said main wing panel, said auxiliary wing panel having a rearward arcuate slotted portion, means linking said forward auxiliary wing panel and said main wing panel including a projecting element extending from said main wing panel into said arcuate slotted portion of said auxiliary panel only when said main panel is in said high-sweep position, said projecting element being completely removed from said slotted portion of said auxiliary panel when said main wing panel is in said low-sweep position.

7. The variable sweep aircraft of claim 6 including:

control means for selectively positioning said auxiliary wing panel in position for the slotted portion thereof to receive said projecting element extending from said main wing panel, said control means being so constructed and arranged as to permit disengagement of said auxiliary wing panel for free floating pitch rotation about its pivoted connection when said main wing panel is in said low-sweep position and contributory pitching moment from said auxiliary wing is not desired.

8. A variable sweep aircraft comprising:

a fuselage having a fineness ratio suitable for supersonic flight, a wing connected to each side of said fuselage and projecting substantially horizontally and outwardly therefrom, means for increasing the effective wing areal plane when said main wing panel is in said high-sweep position, said means including an auxiliary wing panel disposed in forward adjacency to said main wing panel, said auxiliary wing panel having a straight leading edge adapted for alinement with the leading edge of said main wing panel when said main wing panel is in said high-sweep position, means for connecting said auxiliary wing panel to said fuselage and permitting free-floating pitch rotation of said auxiliary panel in a plane perpendicular to the rotative sweep plane of said main wing panel when said main wing panel is in said low-sweep position, and means for planer alinement of said auxiliary wing panel with said main wing panel prior to sweep of said main wing panel from said low-sweep to said high-sweep position.

9. The variable sweep aircraft of claim 8 wherein:
said means for connecting said auxiliary wing panel to said fuselage includes a single pivot hinge connection laterally extending from said fuselage to a point substantially intermediate the root of said auxiliary wing panel, and said means for planer alinement of said auxiliary wing panel with said main wing panel is so constructed and arranged as to permit selective disengagement of said pivot connection to permit free-floating pitch rotation of said auxiliary wing panel when said main wing panel is in said low-sweep position.

10. The variable sweep aircraft of claim 8 wherein:
said auxiliary wing panel is provided with a straight trailing edge and a straight root portion, said straight trailing edge including an arcuate bifurcation, and said main wing panel including an arcuate projecting extension adapted to matingly engage the arcuate bifurcation in said auxiliary wing panel when said main wing panel is in said high-sweep position.

References Cited by the Applicant
UNITED STATES PATENTS

| | | |
|---|---|---|
| 2,670,910 | 3/1954 | Hill et al. |
| 2,741,444 | 4/1956 | Baynes. |
| 2,744,698 | 5/1956 | Baynes. |
| 2,793,826 | 5/1957 | Fielder. |
| 2,822,995 | 2/1958 | Bowen. |
| 3,064,928 | 11/1962 | Toll. |
| 3,104,082 | 9/1963 | Polhamus. |
| 3,153,523 | 10/1964 | Lowman. |

MILTON BUCHLER, *Primary Examiner.*

B. BELKIN, *Assistant Examiner.*